United States Patent Office 3,412,111
Patented Nov. 19, 1968

3,412,111
PROCESS FOR REACTING AN OLEFIN WITH MALEIC ANHYDRIDE TO OBTAIN AN ALKENYL SUCCINIC ANHYDRIDE
Philip G. Irwin, Verona, and Charles M. Selwitz, Pitcairn, Pa., assignors to Gulf Research & Development Company, Pittsburgh, Pa., a corporation of Delaware
No Drawing. Filed June 2, 1965, Ser. No. 460,837
5 Claims. (Cl. 260—346.8)

ABSTRACT OF THE DISCLOSURE

A process for reacting an olefin with a maleic anhydride to obtain an alkenyl succinic anhydride wherein the reaction is carried out in the presence of a hydroxy aromatic or an amino aromatic in order to reduce polymer during the reaction.

---

This invention relates to a process for reacting an olefin with a maleic anhydride to obtain an alkenyl succinic anhydride. Alkenyl succinic anhydrides can be employed as curing agents for epoxy resins, elastomers, rust inhibitors, anticorrosive agents, viscosity improvers, greases, demulsifying agents, slushing compounds, fungicides, plasticizers, surfactants, pharmaceuticals, etc.

Theoretically, one mol of a maleic anhydride can be added to one mol of an olefin to obtain an alkenyl succinic anhydride. In order to obtain an effective addition reaction, however, a molar excess of olefin is employed, for example, about 0.5 to about 20 mols of olefin per mol of the maleic anhydride. The reaction can be carried out by heating said reactants at a temperature of about 160° to about 300° C., preferably at a temperature of about 185° to about 225° C. over a period of time that can vary from about 0.1 to about 48 hours, preferably from about two to about eight hours. Any suitable pressure, preferably sufficient to maintain the reactants in liquid phase, can be employed, from about one to about 1000 pounds per square inch gauge, preferably from about 10 to about 500 pounds per square inch gauge.

Any olefin having from three to 60 carbon atoms can be employed in the reaction with the maleic anhydride, although alpha olefin shaving from six to 30 carbon atoms, preferably from ten to 20 carbon atoms can be employed. Examples of such olefins are propylene, butene-1, pentene-1, hexene-1, heptene-1, octene-1, nonene-1, decene-1, undecene-1, dodecene-1, tridecene-1, tetradecene-1, pentadecene-1, hexadecene-1, heptadecene-1, octadcene-1, nonadecene-1, eicosene-1, heneicosene-1, docosene-1, tricosene-1, tetracosene-1, pentacosene-1, hexacosene-1, heptacosene-1, octacosene-1, nonacosene-1, triacontene-1, hentriacontene-1, dotriacontene-1, tritriacontene-1, tetratriacontene-1, nonene-3, decene-4, 7-methyldecene-2, 7-methyldecene-1, 6,9-diethylundecene-1, 5,7-dimethyldodecene-1, 4,7,9-trimethyltridecene-1, 5-butyltetradecadiene-1,5, 8-phenylpentadecene-1, 7-cyclohexylhexadecene-1, 11-(alpha-cumyl) heptadecene-1, 6-butyloctadecadiene-1,11, 5-(2-norbornyl) nonadecene-1, 6-ethyleiscosene-1, 8-t-butyltricosene-1, 7-phenyldocosene-1, 4-methyloctene-1, 4-methylpentadecene-1, 5-methylpentadecene-1, 8-methylpentadecene-1, 9-methylpentadecene-1, 10-phenyldecene-1, 10-cyclohexyldecene-1, 10-cyclooctyldecene-1, 4,5,6,7-tetramethyloctene-1, 4,6,7-trimethyldecene-1, 4,6,7-trimethyldodecene-1, 9-chlorononene-1, 5-methoxydecene-1, 7,11-diphenylundecene-1, 11-dodecen-1-al, 8-ketotridecene-1, decene-2, 14-cyanopentadecene-1, 10-undecenoic acid, 15-n-hexadecenoic acid, isooctyl 16-m-heptadecanoate, 12-(alpha-cumyl)octadecene-1, 14-ketononadecene-1, 20-N-acetoxyaminoeicosene-1, 22-p-tolyldocosene-1, 20-(b-thieno)tricosene-1, 20 - (alphanaphthyl)tetracosene-1, 12-keto-23-thiapentacosene-1, 17-bromoheptacosene-1, 28-cyanooctacosene-1, 20-acetoxy-nonacosene-1, 18-butoxytriacontene-1, 30-thia-dotriacontene-1, 30-oxa-tritriacontene-1, 24-aza-tetratriacontene-1, 4-trimethylsilylhexene-1, 1,2-epoxyheptene-6, 2-(7-methyl 11-decenyl)-1,4-benzoquinone, 10,11-difluoro-6,9-diethylundecene-1, 5,7-dimethyl-6-oxadodecene-1, 4,7-dimethyltridec-1-ene-9,10,11,12 - tetracarboxylic dianhydride, 4-butyltetradecadiene-1,5, 8-(p-chloromercuriphenyl)pentadecene-1, 7-(4-nitrocyclohexyl)hexadecene-1, 11-(alpha-cumyl)heptadecene-1, 6-(para-isopropylphenyl)decene-1, 5-(2-norbornyl) nonadecene-1, 6-butyloctadecadiene-1,11, 8-tertiarybutyl-12-(2-4-dichloro methyltetrahydrofuran)-tetradecene-1, 7-phenyl - 10 - (2-[6,6-dibromo-3-oxabicyclo(3.1.0)hexyl]) docosene-1, 4-methyloctene-1, 4-methylpentadecatetraene-1,4,7,12, diethyl - 14 - pentadecenyl-succinate, 8-diazomethyl pentadecene-1, 9-carboxymethyl pentadecene-1, 10-(2,3-diiodophenyl)decene-1, 10-(1,2,4-cyclohexadienyl) decene-1, 10-cyclopentyl-decadiene-1,10, 4,7-diketo-10-cyclooctyldecene-1, 4,5,6,7-tetrachloromethyloctene-1, 4,6,7-trinitromethyldecene-1, 4,6,7-triphenoxymethyl dodecene-1, tricontene-1, hexacontene-1, etc. The maletic anhydride can be maleic anhyride itself or a monosubstituted maleic anhydride, such as citraconic anhydride, ethylmaleic anhydride, methoxymaleic anhydride, etc.

The reaction product at the end of the reaction period can be treated in any suitable manner to recover the individual components therefrom. Thus, the reaction product can be distilled at a temperature of about 50° to about 250° C. and a pressure of about $10^{-4}$ to about 15 pounds per square inch gauge to recover separately therefrom unreacted olefin, unreacted maleic anhydride, if present, and the desired alkenyl succinic anhydride.

We have found, however, that during the procedure defined above leading to alkenyl succinic anhydride, an appreciable amount of polymer is formed that cuts down on the efficiency of the reaction. While we are not certain we believe that the polymer formed results from reaction of the product alkenyl succinic anhydride with unreacted maleic anhydride. We have found, however, that if the olefin is reacted with the maleic anhydride under the conditions defined above in the presence of a controlled amount of a hydroxy aromatic or an amino aromatic compound the reaction efficiency is increased and polymer formation is appreciably inhibited.

The hydroxy aromatic can be either a monoaromatic hydroxy or a diaromatic hydroxy compound. Examples of such compounds that can be employed are phenol, o-cresol, m-cresol, p-cresol, thymol, carvacrol, durenol, isodurenol, di-tertiary-butylhydroquinone, 2-, 3- and 4-aminophenols, hydroquinone, resorcinol, catechol, thymohydroquinone, olivetol, etc. Amino aromatics that can be employed can also be monoaromatic or diaromatic. Examples of such compounds that can be employed are phenothiazine, diphenylamine, 4,4'-thio bis (6-tertiary-butyl-o-cresol), tetramethyl thiuram disulfide, 2-aminodiphenylamine, 4-aminodiphenylamine, 4,4'-diaminodiphenylamine, 2-hydroxydiphenylamine, 3-hydroxydiphenylamine, 4-hydroxydiphenylamine, di-2-tolylamine, di-3-tolylamine, di-4-tolylamine, 3,4-ditolylamine, 1-naphthylphenylamine, 2-naphthylphenylamine, 1-naphthyl-2-tolylamine, 1-naphthyl-4-tolylamine, 2-naphthyl-2-tolylamine, 2-naphthyl-4-tolylamine, 9,10-dihydrophenazine, etc. The amount of hydroxy aromatic or amino aromatic employed can be from about 0.01 to about ten per cent by weight, preferably from about 0.1 to about three per cent by weight, relative to the maletic anhydride.

The reaction of the olefin with the maleic in the presence of the hydroxy aromatic or amino aromatic to obtain the alkenyl succinic anhydride is carried out as described hereinabove. The hydroxy aromatic or amino aromatic may be either solid or liquid. In any event, the mixture is stirred during the reaction. At the end of the reaction, the separate components, including the hydroxy aromatic or the amino aromatic, are separated from each other. In some cases, the added compound is lighter than some of the components in the reaction mixture and may be recovered prior to some of them. In the case wherein the defined additive is as heavy or heavier than the polymer that may be formed, it remains, of course, in the reaction zone.

The invention defined herein can be further illustrated by the following. Into a reactor which was maintained at atmospheric pressure there was added dodecene-1, maleic anhydride and a selected amount of a defined additive. The mixture was heated while stirring, and at the end of the reaction period was analyzed for its composition. The results obtained are set forth in the following table.

|  | Additive | | | |
| --- | --- | --- | --- | --- |
|  | None | 2,2'-di(p-hydroxy-phenyl) propane | Hydroquinone | Phenothiazine |
| Amount of Additive, Grams | One | One | One | One |
| Temperature, °C | 186-217 | 185-211 | 185-215 | 185-220 |
| Time, Hours | 7 | 8 | 7 | 7 |
| Weight In, Grams: | | | | |
| Dodecene-1 | 337 | 337 | 380 | 337 |
| Maleic Anhydride | 98 | 98 | 115 | 98 |
| Weight Out, Grams: | | | | |
| Dodecene-1 | 210 | 191 | 228 | 215 |
| Maleic Anhydride | 10 | 22 | 17 | 35 |
| Dodecenylsuccinic Anhydride | 163 | 180 | 220 | 173 |
| Polymer | 53 | 42 | 22 | 12 |
| Conversion, Weight Percent Based On Maleic Anhydride | 90 | 78 | 85 | 64 |
| Efficiency, Percent Based on Maleic Anhydirde | 68 | 87 | 83 | 100 |

The advantage of operating in accordance with our process is apparent from a study of the data in the above table. Note that in each instance wherein an additive of the type defined was employed the amount of polymer formed was reduced substantially and the efficiency to alkenyl succinic anhydride was increased. In fact, when phenothiazine was employed the efficiency was increased to 100 percent.

Obviously many modifications and variations of the invention, as hereinabove set forth, can be made without departing from the spirit and scope thereof, and only such limitations should be imposed as are indicated in the appended claims.

We claim:

1. In the process wherein an alpha olefin having from six to thirty carbon atoms is reacted with maleic anhydride at a temperature of about 160° to about 300° C. for about 0.1 to about 48 hours to obtain an alkenyl succinic anhydride, the improvement which comprises conducting said reaction in the presence of an hydroxy aromatic compound selected from the group consisting of phenol, o-cresol, m-cresol, p-cresol, thymol, carvacrol, durenol, isodurenol, di-tertiary-butylhydroquinone, 2-, 3- and 4-aminophenols, hydroquinone, resorcinol, catechol, thymohydroquinone, olivetol, and 2,2'-di(p-hydroxyphenyl)propane, whereby the amount of polymer formed during said reaction is reduced.

2. The process of claim 1 wherein said reaction is carried out in the presence of hydroquinone.

3. The process of claim 1 wherein said reaction is carried out in the presence of 2,2'-di(p-hydroxyphenyl)propane.

4. In the process wherein an alpha olefin having from six to thirty carbon atoms is reacted with maleic anhydride at a temperature of about 160° to about 300° C. for about 0.1 to about 48 hours to obtain an alkenyl succinic anhydride, the improvement which comprises conducting said reaction in the presence of an amino aromatic selected from the group consisting of phenothiazine, diphenylamine, 4,4$_2$-thio bis(6-tertiary-butyl-o-cresol), tetramethyl thiuram disulfide, 2-aminodiphenylamine, 1-naphthyl-4-tolylamine, 2-naphthyl-2-tolylamine, amine, 2-hydroxydiphenylamine, 3-hydroxydiphenylamine, 4-hydroxydiphenylamine, di-2-tolylamine, di-3-tolylamine, di-4-tolylamine, 3,4-ditolylamine, 1-naphthylphenylamine, 2-naphthylphenylamine, 1-naphthyl-2-tolylamine, 1-naphthyl-4-tolylamine, 2-naphthyl-2-tolylamine, 2-naphthyl-4-tolylamine, 9,10-dihydrophenzine, whereby the amount of polymer formed during said reaction is reduced.

5. The process of claim 4 wherein said reaction is carried out in the presence of phenothiazine.

References Cited

UNITED STATES PATENTS 3,288,714   11/1966   Osuch _____ 260—346.8

NICHOLAS S. RIZZO, *Primary Examiner.*

DONALD G. DAUS, *Assistant Examiner.*

UNITED STATES PATENT OFFICE
CERTIFICATE OF CORRECTION

Patent No. 3,412,111                                November 19, 1968

Philip G. Irwin et al.

It is certified that error appears in the above identified patent and that said Letters Patent are hereby corrected as shown below:

Column 4, line 11, beginning with "4. In the process" cancel all to and including "reduced." in line 43, same column 4, and insert the following:

4. In the process wherein an alpha olefin having from six to thirty carbon atoms is reacted with maleic anhydride at a temperature of about 160° to about 300° C. for about 0.1 to about 48 hours to obtain an alkenyl succinic anhydride, the improvement which comprises conducting said reaction in the presence of an amino aromatic selected from the group consisting of phenothiazine, diphenylamine, 4,4′-thio-bis(6-tertiary-butyl-o-cresol), tetramethyl thiuram disulfide, 2-aminodiphenylamine, 4-aminodiphenylamine, 4,4′-diaminodiphenylamine, 2-hydroxydiphenylamine, 3-hydroxydiphenylamine, 4-hydroxydiphenylamine, di-2-tolylamine, di-3-tolylamine, di-4-tolylamine, 3,4-ditolylamine, 1-naphthylphenylamine, 2-naphthylphenylamine, 1-naphthyl-2-tolylamine, 1-naphthyl-4-tolylamine, 2-naphthyl-2-tolylamine, 2-naphthyl-4-tolylamine, 9,10-dihydrophenzine, whereby the amount of polymer formed during said reaction is reduced.

Signed and sealed this 17th day of March 1970.

(SEAL)
Attest:

EDWARD M. FLETCHER, JR.                   WILLIAM E. SCHUYLER, JR.
Attesting Officer                            Commissioner of Patents